(12) United States Patent
Yamazaki et al.

(10) Patent No.: US 9,128,348 B1
(45) Date of Patent: Sep. 8, 2015

(54) LIGHT MODULATION CIRCUIT

(71) Applicant: NIPPON TELEGRAPH AND TELEPHONE CORPORATION, Tokyo (JP)

(72) Inventors: Hiroshi Yamazaki, Atsugi (JP); Hiroshi Takahashi, Atsugi (JP); Takashi Goh, Atsugi (JP); Takashi Saida, Atsugi (JP); Kiyofumi Kikuchi, Atsugi (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 14/418,386

(22) PCT Filed: Sep. 26, 2013

(86) PCT No.: PCT/JP2013/005744
§ 371 (c)(1),
(2) Date: Jan. 29, 2015

(87) PCT Pub. No.: WO2014/050123
PCT Pub. Date: Apr. 3, 2014

(30) Foreign Application Priority Data

Sep. 28, 2012 (JP) .................................. 2012-217233

(51) Int. Cl.
*G02F 1/035* (2006.01)
*G02F 1/225* (2006.01)
*G02F 1/21* (2006.01)

(52) U.S. Cl.
CPC .............. *G02F 1/225* (2013.01); *G02F 1/2255* (2013.01); *G02F 1/2257* (2013.01); *G02F 2001/212* (2013.01); *G02F 2201/126* (2013.01); *G02F 2203/19* (2013.01)

(58) Field of Classification Search
None
See application file for complete search history.

(56) References Cited

U.S. PATENT DOCUMENTS

| 5,278,923 A | 1/1994 | Nazarathy et al. |
| 6,643,051 B1 | 11/2003 | Fuerst et al. |

(Continued)

FOREIGN PATENT DOCUMENTS

| JP | H08-500683 | 1/1996 |
| JP | 2011-221258 | 11/2001 |

(Continued)

OTHER PUBLICATIONS

Yamanaka et al., "11×171 Gb/s PDM 16-QAM Transmission over 1440 km with a Spectral Efficiency of 6.4 b/s/Hz using High-Speed DAC", ECOC 2010, Sep. 2010, We.8.C.1, 3 pages.

(Continued)

*Primary Examiner* — Ryan Lepisto
*Assistant Examiner* — Erin Chiem
(74) *Attorney, Agent, or Firm* — Workman Nydegger

(57) ABSTRACT

An optical modulation circuit includes: a first Mach-Zehnder modulating portion including a first output port and a second output port, wherein the first Mach-Zehnder modulating portion is push-pull driven by a main signal; a second Mach-Zehnder modulating portion connected to the first output port of the first Mach-Zehnder modulating portion, wherein the second Mach-Zehnder modulating portion is push-pull driven by a correction signal; and an asymmetric light combining portion combining an optical signal outputted from an output port of the second Mach-Zehnder modulating portion with an optical signal outputted from the second output port of the first Mach-Zehnder modulating portion in a light intensity coupling ratio of r to 1−r, wherein an optical path length from the first output port to the asymmetric light combining portion is substantially equal to an optical path length from the second output port to the asymmetric light combining portion.

14 Claims, 13 Drawing Sheets

(56) References Cited

U.S. PATENT DOCUMENTS

| | | |
|---|---|---|
| 2002/0154378 A1 | 10/2002 | Kawanishi et al. |
| 2005/0271313 A1 | 12/2005 | Oikawa et al. |
| 2012/0134676 A1 | 5/2012 | Kikuchi |

FOREIGN PATENT DOCUMENTS

| | | |
|---|---|---|
| JP | 2002-268025 | 9/2002 |
| JP | 2003-501685 | 1/2003 |
| JP | 2006-106365 | 4/2006 |
| JP | 2007-288591 | 11/2007 |
| JP | 2012-119759 | 6/2012 |

OTHER PUBLICATIONS

Jinguji et al., "Mach-Zehnder interferometer type optical waveguide coupler with wavelength-flattened coupling ratio", Electron. Letters, Aug. 16, 1990, vol. 26, No. 17, pp. 1326-1327.

Yu Wang-Boulic, "A Linearized Optical Modulator for Reducing Third-Order Intermodulation Distortion," Journal of Lightwave Technology, Aug. 1992, vol. 10, No. 8, pp. 1066-1070.

W.K.Burns, "Linearized Optical Modulator with Fifth Order Correction," Journal of Lightwave Technology, Aug. 1995, vol. 13, No. 8, pp. 1724-1727.

International Search Report in corresponding Application No. PCT/JP2013/005744 dated Dec. 10, 2013.

International Preliminary Report on Patentability and Written Opinion in corresponding Application No. PCT/JP2013/005744 dated Mar. 31, 2015.

LIGHT MODULATION CIRCUIT

TECHNICAL FIELD

The present invention relates to an optical modulation circuit applicable to optical communication systems.

BACKGROUND ART

In order to increase the use efficiency of light spectra, multilevel modulation such as QAM (quadrature amplitude modulation) and OFDM (orthogonal frequency division multiplexing) is being variously examined.

One of the methods for obtaining a multilevel optical signal is to drive a push-pull drive Mach-Zehnder modulator (MZM) using a multilevel electric signal.

FIG. 1 illustrates a conventional push-pull drive MZM 100. The example illustrated herein is a single-ended electrode type MZM using an X-cut lithium niobate ($LiNbO_3$) substrate. In FIG. 1, the MZM 100 includes: a Mach-Zehnder interferometer-type optical circuit including a light splitting portion 101 and a light combining portion 102; a traveling wave-type modulating electrode 103; and a DC bias electrode 104 of lumped parameter-type. For simplifying the drawing, each electrode is illustrated with only a signal line, and the ground electrode is not illustrated. An optical signal propagating each optical waveguide is given phase shifts of $+\phi$ and $-\phi$ by a driving electric signal inputted to the modulating electrode 103. Herein, $\phi=(\pi/2V_\pi)\cdot V$ where V is a voltage level of the driving electric signal and $V_\pi$ is a voltage to change the relative optical phase between the arms by $\pi$. The optical signal propagating each optical waveguide is further given a phase difference of $\pi$ by bias voltage applied by the DC bias electrode 104. Herein, the MZM light electric-field response is represented by $\sin \phi$.

FIG. 2 illustrates a response curve of the electric field of the output optical signal to the driving voltage in the conventional MZM. As shown in FIG. 2, in the conventional MZM, the response curve with respect to the driving voltage is non-linear. Accordingly, when the MZM is driven by a multilevel electric signal, the output optical signal is shifted from an ideal and equal interval output optical signal obtained when the response curve is linear.

On the other hand, if the amplitude of the driving voltage is reduced from $2V_\pi$ in order to reduce the signal distortion, large optical loss is generated as illustrated in FIG. 3 (see NPL 1).

CITATION LIST

Non-Patent Literature

NPL 1: Shogo Yamanaka, Takayuki Kobayashi, Akihide Sano, Hiroji Masuda, Eiji Yoshida, Yutaka Miyamoto, Tadao Nakagawa, Munehiko Nagatani, Hideyuki Nosaka, "11×171 Gb/s PDM 16-QAM Transmission over 1440 km with a Spectral Efficiency of 6.4 b/s/Hz using High-Speed DAC", ECOC 2010, 2010, We. 8. C. 1

NPL 2: K. Jinguji, N. Takato, A. Sugita, and M. Kawachi, "Mach-Zehnder interferometer type optical waveguide coupler with wavelength-flattened coupling ratio", Electron. Letters, 1990, Vol. 26, No. 17, pp. 1326-1327

SUMMARY OF INVENTION

Technical Problem

The present invention has been made in the light of the aforementioned problems, and an object of the present invention is to provide an optical modulation circuit which suppresses the non-linearity of light electric-field response.

Solution to Problem

In order to achieve the aforementioned object, an optical modulation circuit according to a first aspect of the present invention includes: a first Mach-Zehnder modulating portion including a first output port and a second output port, wherein the first Mach-Zehnder modulating portion is push-pull driven by a main signal; a second Mach-Zehnder modulating portion connected to the first output port of the first Mach-Zehnder modulating portion, wherein the second Mach-Zehnder modulating portion is push-pull driven by a correction signal; and an asymmetric light combining portion combining an optical signal outputted from an output port of the second Mach-Zehnder modulating portion with an optical signal outputted from the second output port of the first Mach-Zehnder modulating portion in a light intensity coupling ratio of r to 1−r, wherein an optical path length from the first output port to the asymmetric light combining portion is substantially equal to an optical path length from the second output port to the asymmetric light combining portion.

In order to achieve the aforementioned object, moreover, an optical modulation circuit according to a second aspect of the preset invention includes: a first Mach-Zehnder modulating portion including a first input port and a second input port, wherein first Mach-Zehnder modulating portion is push-pull driven by a main signal; a second Mach-Zehnder modulating portion connected to the first input port of the first Mach-Zehnder modulating portion, wherein the second Mach-Zehnder modulating portion is push-pull driven by a correction signal; and an asymmetric light combining portion splitting an input optical signal in a light intensity splitting ratio of r to 1−r to an input port of the second Mach-Zehnder modulating portion and the second input port of the first Mach-Zehnder modulating portion, wherein an optical path length from the asymmetric light splitting portion to the first input port is substantially equal to an optical path length from the asymmetric light splitting portion to the second input port.

In an optical modulation circuit according to a third aspect of the present invention, wherein the light intensity coupling ratio r is 0<r<0.3.

In an optical modulation circuit according to a fourth aspect of the present invention, wherein the correction signal is the same as the main signal or is an inverted signal of the main signal, and wherein a delay equivalent to a propagation time of an optical signal to propagate between the first Mach-Zehnder modulating portion and the second Mach-Zehnder modulating portion is given between the correction signal and the main signal.

An optical modulation circuit according to a fifth aspect of the present invention further includes: a connecting portion connecting a modulating electrode of the first Mach-Zehnder modulating portion and a modulating electrode of the second Mach-Zehnder modulating portion, wherein a signal propagation delay due to the connecting portion is equal to a propagation time of an optical signal to propagate between the first Mach-Zehnder modulating portion and the second Mach-Zehnder modulating portion.

In an optical modulation circuit according to a sixth aspect of the present invention, wherein one of the modulating electrode of the first Mach-Zehnder modulating portion and the modulating electrode of the second Mach-Zehnder modulating portion which is farther from an electrical input is longer than the modulating electrode closer to the electrical input.

An optical modulation circuit according to a seventh aspect of the present invention includes: two optical modulation circuits according to claim 1 or 2 arranged in parallel; a light splitting portion splitting input light from an input port to input the split beams into the two optical modulation circuits; a light combining portion combining output light beams from the two optical modulation circuits; and a phase adjustment portion provided on an optical path from the light splitting portion to the light combining portion, wherein the phase adjustment portion adjusts optical phases so that the output light beams from the two optical modulation circuits are combined with an optical phase difference of $\pi/2$ by the light combining portion.

A polarization multiplexing IQ modulation circuit according to an eighth aspect of the present invention includes: two optical IQ modulation circuits according to claim 7 arranged in parallel; a light splitting portion which splits input light from an input port to input the split beams into the two optical IQ modulation circuits; a polarization rotator rotating polarization of an output light beam from a first optical IQ modulation circuit among the two optical IQ modulation circuits by 90 degrees; and a polarization combining portion orthogonal polarization-multiplexing the output light beam from the first optical IQ modulation circuit with the polarization rotated by the polarization rotator and an output light beam from the second optical IQ modulation circuit to output to the output port as a polarization multiplexed signal.

Advantageous Effects of Invention

According to the present invention, it is possible to provide an optical modulation circuit having response characteristics with the non-linearity reduced by generating a secondary component in the light electric-field response to the driving voltage to add the same to the primary component.

DESCRIPTION OF EMBODIMENTS

Figure 1:
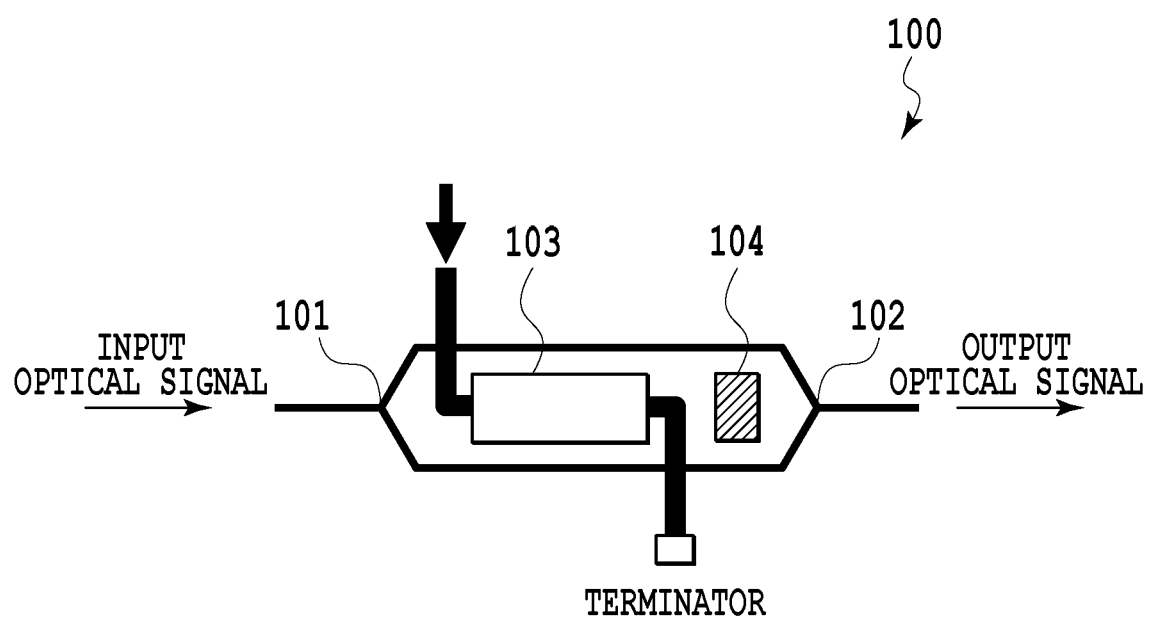
FIG. 1 is a configuration diagram illustrating the configuration of a conventional MZM.

The present invention relates to a circuit configuration of modulation circuits, and the effect thereof is independent of the materials constituting the modulation circuits. In the embodiments shown below, the materials constituting the modulation circuits are not particularly specified. The materials constituting the modulation circuits can be multicomponent oxide crystals with the Pockels effect, which is a kind of electro-optic (EO) effects, such as $LiNbO_3$ (LN), $KTa_{1-x}Nb_xO_3$, $K_{1-y}Li_yTa_{1-x}Nb_xO_3$, GaAs-based or InP-based compound semiconductors capable of implementing refractive-index modulation by the Pockels effect and quantum confined stark effect (QCSE), and polymers with an EO effect, such as chromophore. Moreover, for the purpose of manufacturing a modulation circuit having a complicated configuration with a low loss, the optical modulation circuit may have a joint structure of different types of substrates including a substrate made of one of the aforementioned materials and a silica-based planar lightwave circuit (PLC).

The effects of the present invention can be obtained in any case where the modulating electrode of the Mach-Zehnder modulating portion is single-ended type or differential type. As generally well known, the arrangement of the modulating electrode in the push-pull driving Mach-Zehnder modulation circuit depends on the type of the substrate, the direction of the crystal axis thereof, and the like. Generally, the single-ended type is used in X-cut LN substrates, and the differential type is used in Z-cut LN substrates (even in Z-cut LN substrates, the modulating electrode can be configured as the single-ended type by using polarization reversal), for example. Normally, the signal electrode of the single-ended type is placed in the middle between the optical waveguide arms, and the signal electrodes of the differential type are placed just above the respective arms (in the case of the single-ended type using a polarization-reversed Z-cut LN substrate, the signal electrode is placed just above one of the arms). In the optical modulation circuit according to the embodiments shown in the examples below, a description is given by basically assuming the single-ended type for simplification of the drawings. However, even in the case of using the differential-type, the response characteristic of the Mach-Zehnder modulating portion reduces to the same mathematical expression as that of the single-ended type. Accordingly, the choice of the electrode arrangement cannot influence the effect of the present invention. The drawings concerning the embodiments shown below by way of example illustrate the signal electrodes but not ground electrodes for simplification.

In the optical modulation circuit according to each embodiment illustrated below by way of example, the both arms in the Mach-Zehnder modulating portion are designed to have a same optical path length. The optical path lengths of the arms have some differences therebetween in practice because of process errors, DC drifts, and the like, but generally, such differences are compensated by adjusting the DC bias. The amount of compensation varies depending on the materials, manufacturing conditions, use environments of the modulator, and the like and cannot be uniquely decided. Accordingly, in the following embodiments, the phase difference between the arms given by the DC bias does not include the compensation of the optical path lengths.

First Embodiment

Figure 4:
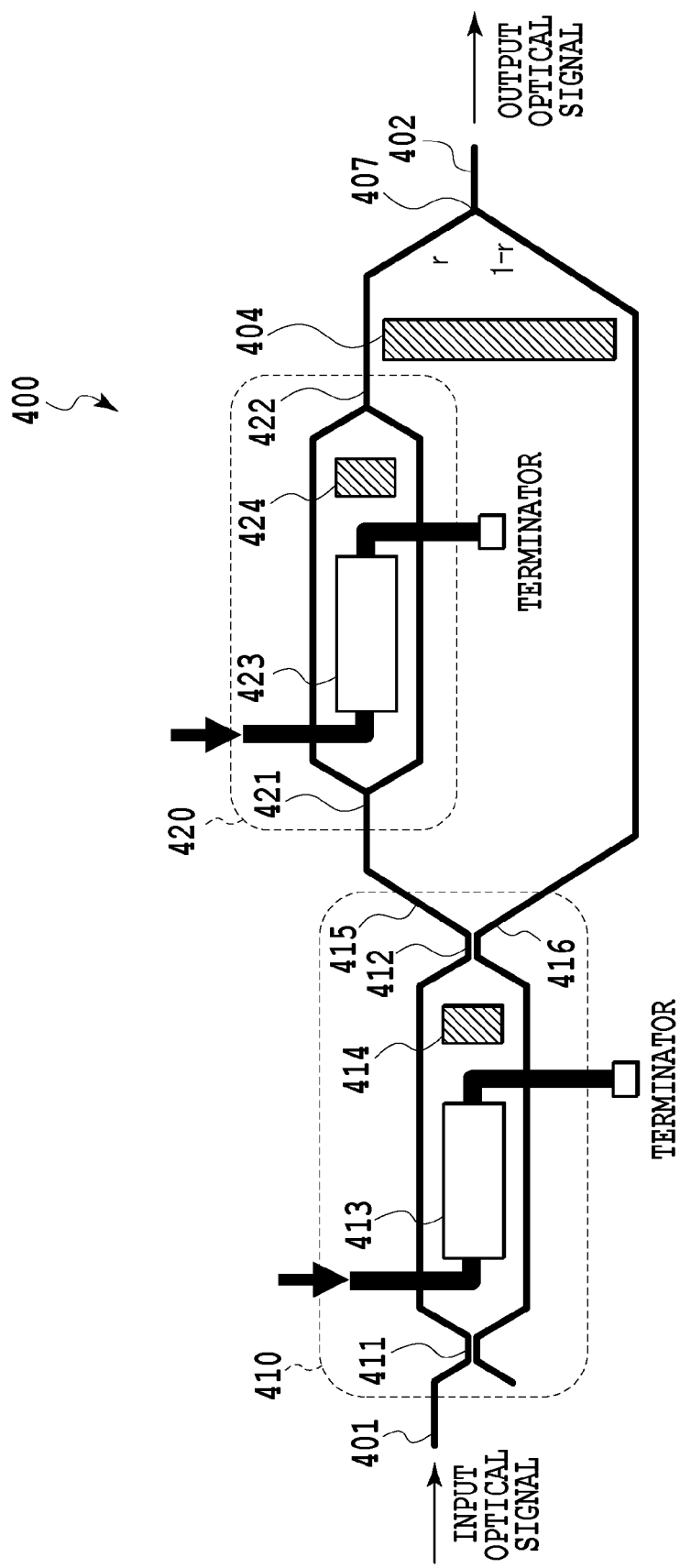
FIG. 4 is a configuration diagram illustrating the configuration of an optical modulation circuit according to a first embodiment of the present invention.

FIG. 4 illustrates an optical modulation circuit 400 according to a first embodiment of the present invention.

In FIG. 4, the optical modulation circuit 400 includes a main input port 401, first and second Mach-Zehnder modulating portions 410 and 420, asymmetric light combining portion 407, and a main output port 402. The first Mach-Zehnder modulating portion 410 has a 2-output cross-bar switch configuration using directional couplers 411 and 422 as input-side and output-side couplers, respectively. A cross-side output port 416 is connected to the asymmetric light combining portion 407. A bar-side output port 415 is connected to the second Mach-Zehnder modulating portion 420. The second Mach-Zehnder modulating portion 420 has a 1-input 1-output configuration using Y couplers 421 and 422 as the input-side and output-side couplers, respectively. The Mach-Zehnder modulating portions 410 and 420 include traveling-wave type modulating electrodes 413 and 423 and lumped-parameter type DC-bias electrodes 414 and 424, respectively. Furthermore, the optical modulation circuit 400 separately includes a DC bias electrode 404 for adjusting the relative phase of the optical signals inputted into the asymmetric light combining portion 407. In the Mach-Zehnder modulating portions 410 and 420, the DC bias electrodes 414 and 424 are used to adjust the phases so that the phase difference between the arms is π when the voltage of the driving signal is zero. The asymmetric light combining portion 407 may be composed of an asymmetric coupler with the coupling ratio fixed but may be conveniently a variable coupler whose coupling ratio is adjustable for flexible adjustment. The optical path length from the bar-side output port 415 of the first Mach-Zehnder modulating portion 410 through the second Mach-Zehnder modulating portion 420 to the asymmetric light combining portion 407 is the same as that of the optical path from the cross-side output port 416 of the first Mach-Zehnder modulating portion 410 to the asymmetric light combining portion 407.

In addition to the main output port 402, a tap circuit and a monitor output port may be properly arranged to monitor the signal state in the middle of the circuit. The tap circuit can be placed at the two output ports of the first Mach-Zehnder modulating portion 410, the output ports of the second Mach-Zehnder modulating circuit 420, and the like.

Herein, the light electric-field responses at the cross-side and bar-side of the first Mach-Zehnder modulating portion 410 are indicated by $T_{1c}$ and $T_{1b}$, respectively. The light electric-field response of the second Mach-Zehnder modulating portion 420 is indicated by $T_2$. The light electric-field response of the entire modulation circuit is indicated by T. $T_{1c}$, $T_{1b}$, $T_2$, and T are expressed by Equation 1 below. Herein, the non-essential phase coefficient is omitted.

[Equation 1]

$$T_{1c} = \sin(\phi_1) = \sin\left(\frac{\pi}{2V_{\pi 1}} V_1\right) \quad (1)$$

$$T_{1b} = \cos(\phi_1) = \cos\left(\frac{\pi}{2V_{\pi 1}} V_1\right)$$

$$T_2 = \sin(\phi_2) = \sin\left(\frac{\pi}{2V_{\pi 2}} V_2\right)$$

$$T = \sqrt{1-r} \cdot T_{1c} + e^{j\theta} \cdot \sqrt{r} \cdot T_2 \cdot T_{1b}$$

Constants $V_{\pi 1}$ and $V_{\pi 2}$ denote voltages (constants) that change inter-arm relative optical phases by π in the Mach-Zehnder modulating portions 410 and 420, respectively. Variables $V_1$ and $V_2$ denote driving signal voltages inputted to the Mach-Zehnder modulating portions 410 and 420, respectively. θ denotes the inter-arm phase difference given by the DC bias electrode 404. Moreover, r denotes a light intensity coupling ratio in the asymmetric light combining portion 407. Herein, light coupling intensity of an input from the second Mach-Zehnder modulating portion 402/light coupling intensity of an input from the cross-side output port 416 of the first Mach-Zehnder modulating portion 410 is set to r/1−r. For the above-described equation is of the light electric-field responses, the square roots of r and 1−r are included as coefficients of the respective terms.

$V_2$ needs to be inputted to the modulating electrode with a certain delay with respect to $V_1$. This is because it takes a certain period of time for optical signal modulated by the first Mach-Zehnder modulating portion 410 to reach the second Mach-Zehnder modulating portion 420 and the driving electric signal $V_2$ needs to be delayed accordingly. To be specific, time delay τ of $V_2$ with respect to $V_1$ needs to be τ=NL/c. Herein, L is physical length of the optical waveguide between the point where the interaction between the optical signal and electrical signal starts in the modulating electrode 413, into which $V_1$ is inputted, and the point where the interaction between the optical signal and electrical signal starts in the modulating electrode 423, into which $V_2$ is inputted. N is group velocity of optical signal in the same optical waveguide, and c is light velocity.

In order to obtain a response with high linearity as the final response T, there are two driving methods. One of the methods is to set correction signal $V_2$ equal to inverted signal of main signal $V_1$ ($V_2=-V_1$) and set θ=0, and the other is to set the correction signal $V_2$ equal to the main signal $V_1$ ($V_2=V_1$) and set θ=π. In either method, the response T of the entire modulation circuit is expressed by Equation 2 below.

[Equation 2]

$$T = \sqrt{1-r} \cdot \sin(\phi) - \sqrt{r} \cdot \cos(\phi) \cdot \sin(\phi) \quad (2)$$

$$= \sqrt{1-r} \cdot \sin(\phi) - \frac{\sqrt{r}}{2} \cdot \sin(2\phi)$$

Herein, $\phi=(\pi/2V_{\pi 1})\cdot V_1$, and it is assumed that $V_{\pi 2}=V_{\pi 1}$. In the case of $V_2=V_1$, the same response can be obtained by setting θ=0 instead of θ=π and using the DC bias electrode 424 to adjust the bias voltage so that the inter-arm phase difference of the second Mach-Zehnder modulating portion 420 is −π when the driving signal voltage is zero.

Figure 2:
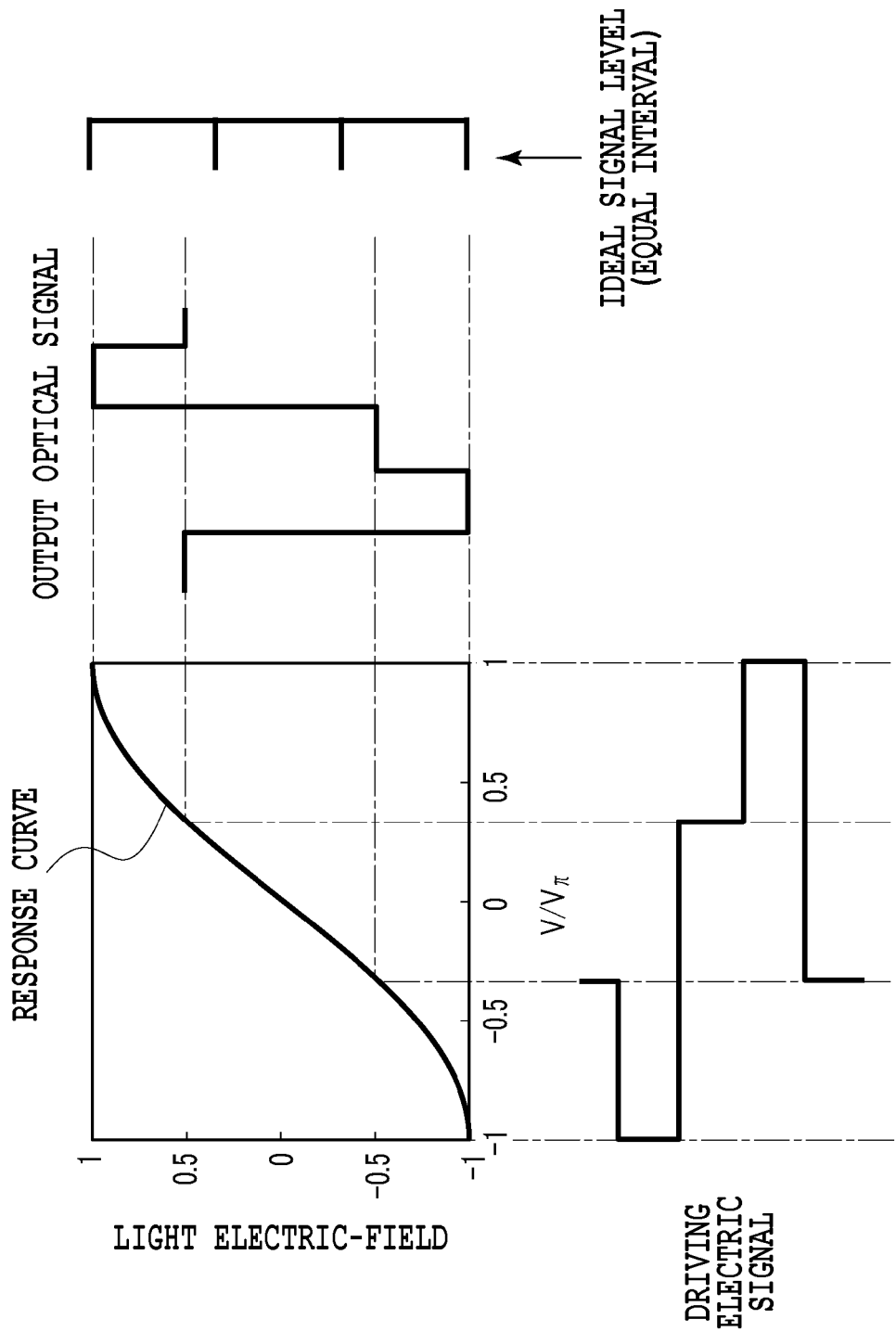
FIG. 2 is a diagram for explaining signal distortion caused in the conventional MZM.
Figure 3:
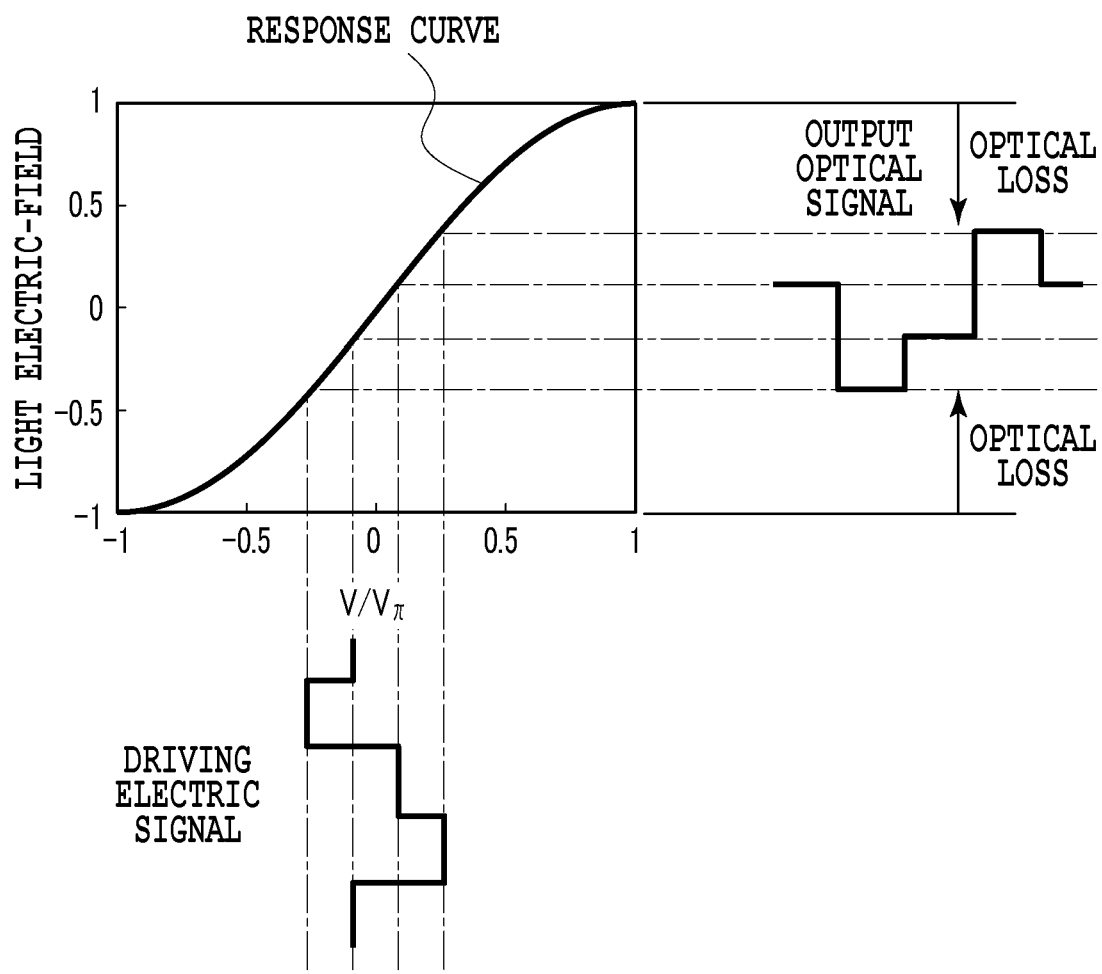
FIG. 3 is a diagram for explaining optical loss caused in the conventional MZM.
Figure 5:
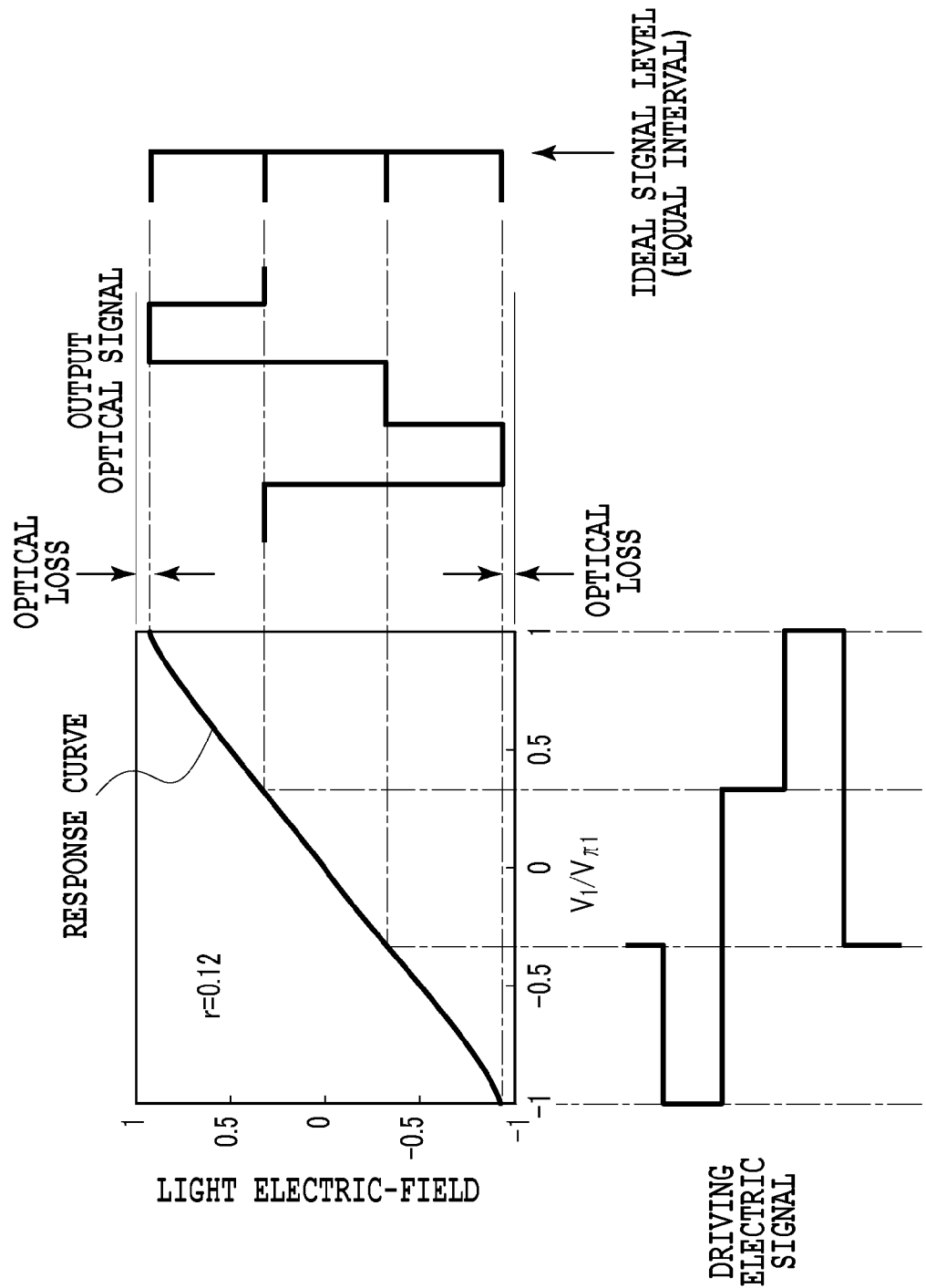
FIG. 5 is a diagram showing a response curve obtained by the optical modulation circuit illustrated in FIG. 4.

FIG. 5 shows a response curve obtained by plotting the values of T relative to $V_1/V_{\pi 1}$ (=2φ/π) when r=0.12 in Equation 2. The responses of a conventional MZM illustrated in FIGS. 2 and 3 are sine functions while the response of the first embodiment shown in FIG. 5 is closer to a straight line and is increased in linearity. Moreover, the optical loss is very little.

Figure 6:
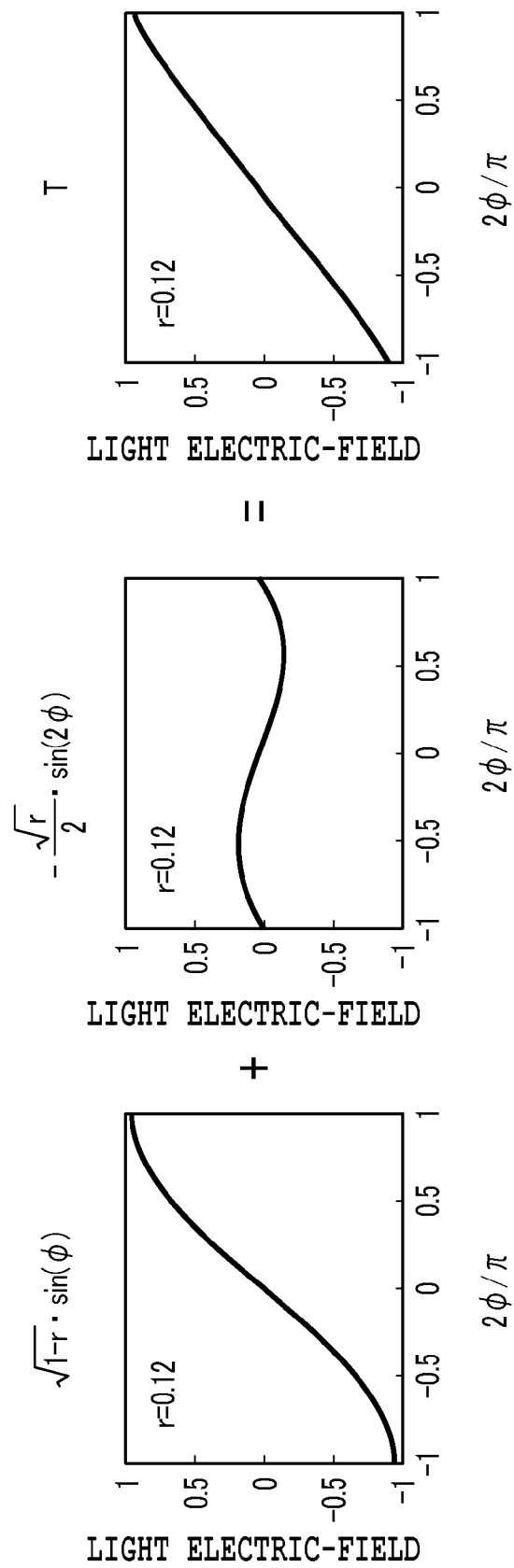
FIG. 6 is a diagram showing response curves which are obtained by plotting the first term of the right-hand side of Equation 2, the second term of the right-hand side thereof, and T of the left-hand side with respect to $V_1/V_{\pi1}$ $(=\phi/\pi)$.

FIG. 6 shows response curves obtained by plotting the first term of the right-hand side of Equation 2, the second term of the right-hand side thereof, and T of the left-hand side thereof relative to $V_1/V_{\pi 1}$ (=$2\phi/\pi$). As shown in FIG. 6, the first term of the right-hand side is a sinusoidal response term similar to the conventional MZM but is added with a sinusoidal response term as the second term which has a response period half of that of the first term and has an opposite sign to the first term. The second term suppresses the non-linearity of the first term, and the response T of the entire modulation circuit is close to a straight line, showing that the linearity thereof is increased.

Hereinafter, in order to qualify the linearity of the response, a description is given of an output optical signal spectrum in the case of driving a modulator with a pure sine signal. In an ideal linear response modulator, the output light electric-field is proportional to the driving signal. Accordingly, the output optical signal spectrum is supposed to include only the fundamental wave components of $f_0 \pm f_s$ for optical carrier frequency $f_0$ where $f_s$ is the frequency of the driving sine wave. However, because the response of an actual modulator includes non-linearity, the output optical signal spectrum thereof includes also harmonic components of $f_0 \pm nf_s$ (n is a natural number not less than 2). The intensity ratio of the fundamental wave component to the maximum harmonic component is called the spurious-free dynamic range (SFDR) and can be used an index of the linearity.

Figure 7A:
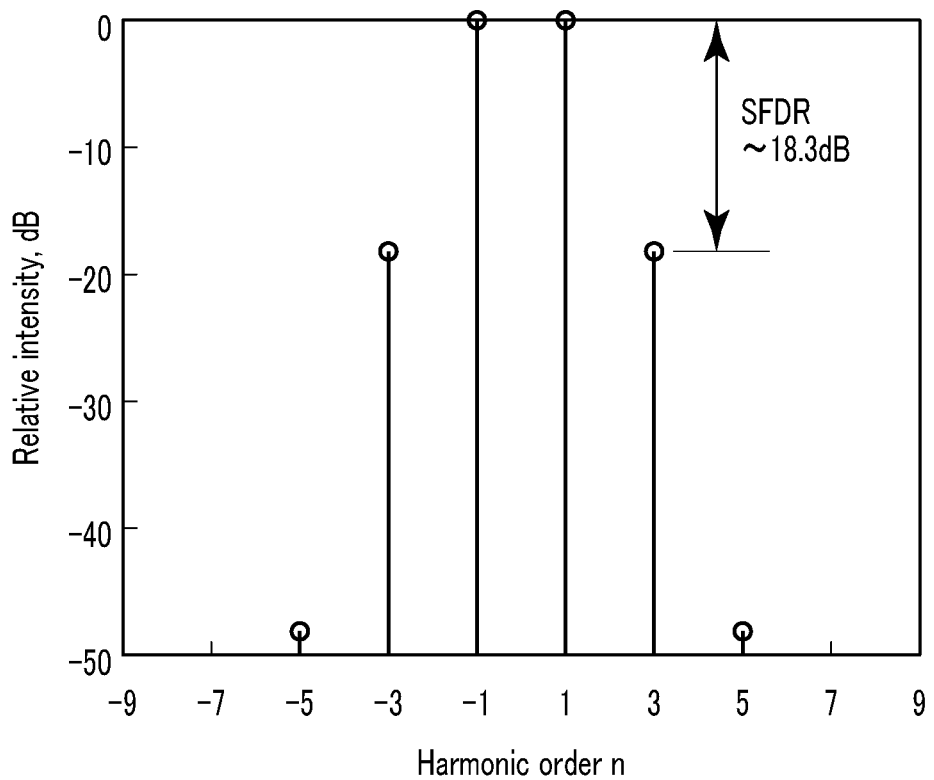
FIG. 7A is a diagram showing an output optical signal spectrum when the optical modulation circuit is driven with a sine wave with a whole amplitude of $2V_{\pi}$.
Figure 7B:
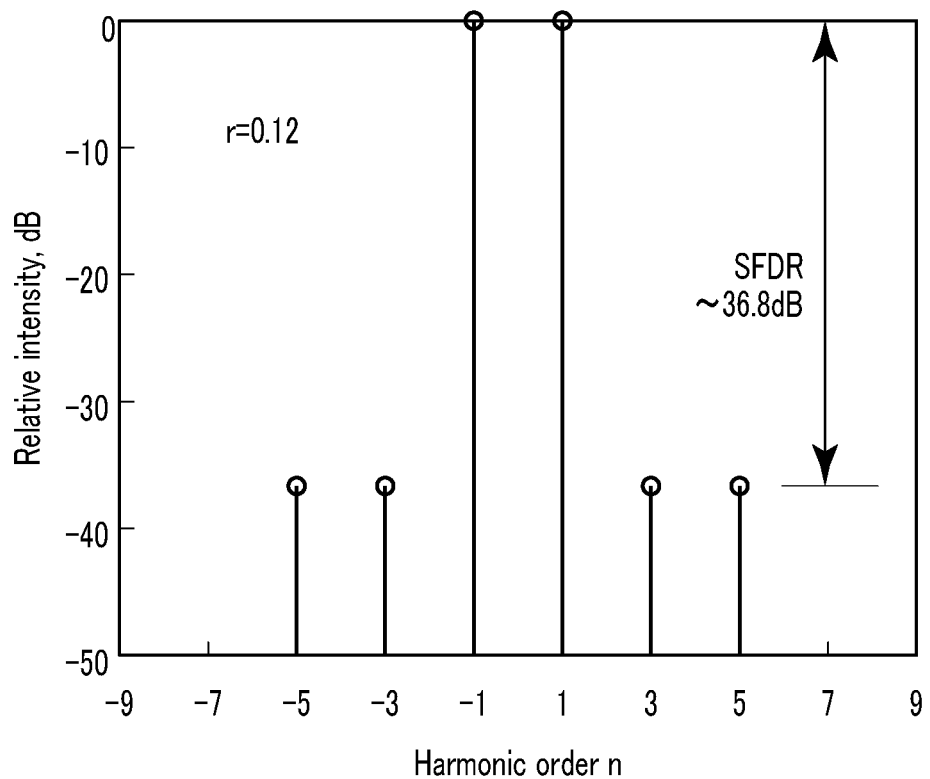
FIG. 7B is a diagram showing an output optical signal spectrum when the optical modulation circuit is driven with a sine wave with a whole amplitude of $2V_{\pi}$.

FIGS. 7A and 7B show output optical signal spectra when the conventional MZM illustrated in FIG. 1 and the optical modulation circuit according to the first embodiment illustrated in FIG. 4 with r=0.12 are individually driven by a sine wave with a whole amplitude of $2V\pi$. In FIGS. 7A and 7B, the horizontal axis represents the harmonic order n, and the vertical axis represents the spectrum intensity. As shown in FIG. 7A, in the conventional MZM, the intensity of the third harmonics is high, and the SFDR is about 18.3 dB. On the other hand, as shown in FIG. 7B, in the optical modulation circuit according to the first embodiment with r=0.12, the third and fifth harmonics have substantially a same intensity, and the SFDR is about 36.8 dB. Accordingly, the SFDR of the optical modulation circuit according to the first embodiment has an improvement of 18.5 dB over the conventional example.

The SFDR depends on the amplitude of the driving sine wave and the value of r. For explaining the dependence, the electric field $E_{out}$ of the output optical signal of the optical modulation circuit according to the first embodiment is developed using the Bessel function of the first kind J as follows. Herein, the driving signal is a sine wave with a whole amplitude of $2\alpha V_\pi$ ($\alpha$ is a modulation index) and an angular frequency $\omega$ (=$2\pi f_s$).

[Equation 3]

$$E_{out} = \sqrt{1-r} \sin\left(\frac{\pi}{2V_\pi}\alpha V_\pi \sin(\omega t)\right) - \frac{\sqrt{r}}{2}\sin\left(\frac{\pi}{V_\pi}\alpha V_\pi \sin(\omega t)\right) \quad (3)$$

$$= 2\sum_{m=0}^{\infty} \left\{\sqrt{1-r}\, J_{2m+1}\left(\frac{\pi\alpha}{2}\right) - \frac{\sqrt{r}}{2} J_{2m+1}(\pi\alpha)\right\} \sin\{(2m+1)\omega t\}$$

The SFDR can be obtained as a ratio of the square of the term with m=0 (the fundamental) to the square of the coefficient of the term with m>0 (harmonic) as follows.

[Equation 4]

$$SFDR_{dB}(\alpha, r) = 20 \cdot \log \frac{\sqrt{1-r}\cdot J_1\left(\frac{\pi\alpha}{2}\right) - \frac{\sqrt{r}}{2}\cdot J_1(\pi\alpha)}{\underset{m}{MAX}\left[\sqrt{1-r}\cdot J_{2m+1}\left(\frac{\pi\alpha}{2}\right) - \frac{\sqrt{r}}{2}\cdot J_{2m+1}(\pi\alpha)\right]} \quad (4)$$

Equation 4 above expresses the SFDR of the output optical signal from the optical modulation circuit according to the first embodiment illustrated in FIG. 4. However, the SFDR of the conventional MZM illustrated in FIG. 1 can be calculated by setting r=0 in Equation 4 because the response of the conventional MZM illustrated in FIG. 1 is the same as the response of the optical modulation circuit according to the first embodiment with r=0.

Figure 8:
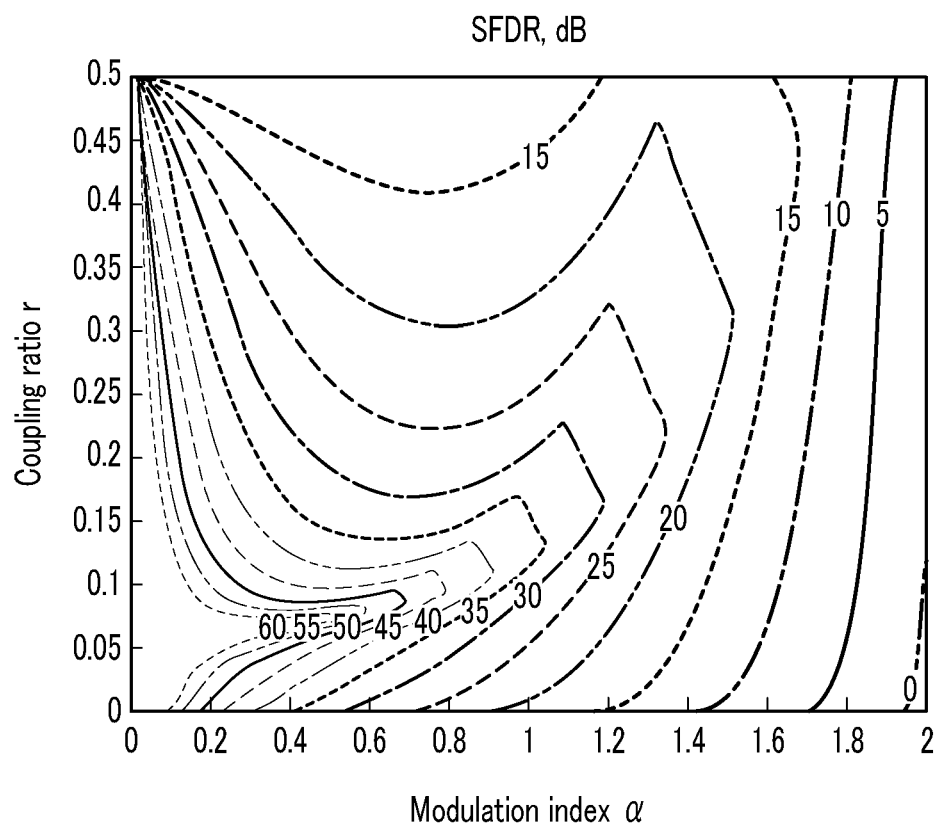
FIG. 8 is a diagram showing r and $\alpha$ dependences of SFDR obtained by Equation 4.

FIG. 8 shows a contour plot of the values of the SFDR obtained by Equation 4 with respect to $\alpha$ on the horizontal axis and r on the vertical axis. As shown in FIG. 8, the optimal value of r (the value of r maximizing the SFDR) changes gradually with $\alpha$. For example, r=0.12 (the condition in FIG. 7B) is optimal when $\alpha$=1, and the SFDR is 36.8 db. When the driving amplitude is reduced to $\alpha$=0.5, r=0.07 is optimal, and the SFDR is 61.5 dB.

Generally, as the driving amplitude is attenuated, the linearity is increased, and the SFDR is increased. However, the theoretical optical loss increases when the driving amplitude is attenuated even in the optical modulation circuit according to the first embodiment in similar manner to when the driving amplitude is attenuated in the conventional MZM as shown in FIG. 3. Herein, the theoretical optical loss refers to an optical loss for the peak voltage of the driving signal. To be specific, the theoretical optical loss is expressed by the following equation.

[Equation 5]

$$Loss_{dB}(\alpha, r) = -20 \cdot \log\left\{\sqrt{1-r}\cdot \sin\left(\frac{\pi\alpha}{2}\right) - \frac{\sqrt{r}}{2}\cdot \sin(\pi\alpha)\right\} \quad (5)$$

Figure 9:
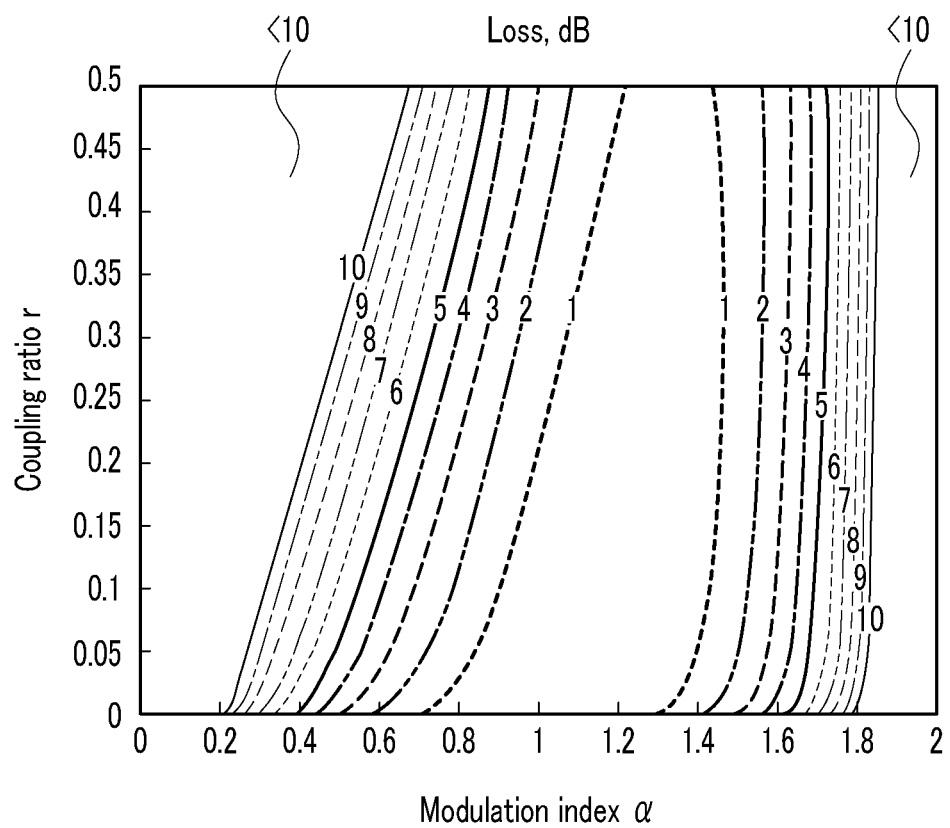
FIG. 9 is a diagram showing r and $\alpha$ dependence of theoretical optical loss obtained by Equation 5.

FIG. 9 shows a contour plot of values of the theoretical optical loss obtained by Equation 5 with respect to $\alpha$ on the horizontal axis and r on the vertical axis. The theoretical optical loss remains as small as 0.56 dB where $\alpha$=1 and r=0.12 (the conditions of FIG. 7B, SFDR=36.8 dB). For providing the comparable SFDR by the conventional technique (corresponding to r=0), it is necessary to narrow the driving amplitude to $\alpha$=0.37. At this time, the theoretical optical loss is 5.21 dB. In other words, if it is necessary that the SFDR is 36.8 dB, the theoretical optical loss of the optical modulation circuit according to the first embodiment can be 4.65 dB lower than that of the conventional technique.

As revealed from FIG. 9, the theoretical optical loss depends on $\alpha$ more than r and is minimized in a range of $\alpha$ from 1.0 to 1.4. On the other hand, as shown in FIG. 8, the SFDR is increased as $\alpha$ is reduced. Specifically, the range of $\alpha$>1.4 is disadvantageous in terms of both the optical loss and SFDR. In the range of $\alpha$>1.4, the optical loss and SFDR substantially trade off each other. Accordingly, the setting range of $\alpha$ is suitably 0<$\alpha$<1.4. Moreover, as shown in FIGS. 8 and 9, the range of r where the SFDR is minimized is located in a range of r<0.3 in 0<$\alpha$<1.4, and the theoretical optical loss is reduced as r is reduced. Accordingly, the setting region of r is suitably 0<r<0.3.

The output coupler 412 of the Mach-Zehnder modulating portion 410 can be a multi-mode interference (MMI) coupler or a wavelength insensitive coupler (WIN) shown in NPL 2 besides the directional coupler. Optical signals from the output ports of any 2-input 2-output coupler are inverted to each other. Accordingly, Equation 1 can be established if the phase adjustment is properly performed using the bias electrode 414. This can be introduced from the reciprocity of optical couplers and the law of conservation of energy (to be strict, the reciprocity could be lost in some cases because of the internal loss of couplers, but is not a problem if couplers with an internal loss small enough are employed). Moreover, the input coupler 411 may be either a 2-input 2-output coupler illustrated in FIG. 4 by way of example or a Y coupler. In the case of using a Y coupler, which is not called a cross-bar switch type, all Equations 1 to 5 described above can be established if the phase difference between the arms is adjusted by the DC bias electrode 414 so that the output light to the cross-side output port 416 is minimized when the driving signal voltage is 0. Accordingly, there is no essential difference between use of the Y coupler and use of the 2-input 2-output coupler. In a similar manner, the couplers 421 and 422 may be individually composed of a 2-input 2-output coupler.

Second Embodiment

Figure 10:
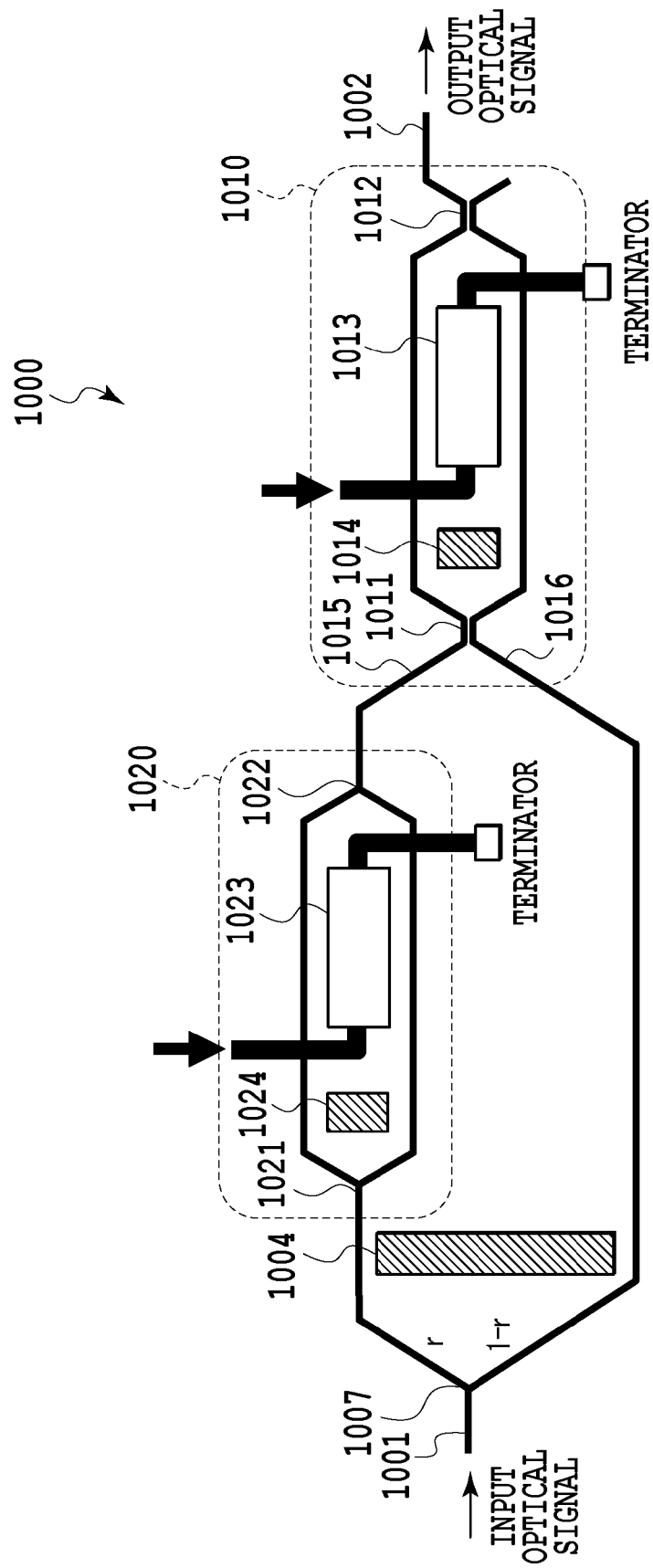
FIG. 10 is a configuration diagram illustrating the configuration of an optical modulation circuit according to a second embodiment of the present invention.

FIG. 10 illustrates an optical modulation circuit 1000 according to a second embodiment of the present invention.

In FIG. 10, the optical modulation circuit 1000 according to the second embodiment of the present invention is the same as the optical modulation circuit 400 of the first embodiment shown in FIG. 4 excepting that the directions that light is inputted and outputted are reversed and modulating electrodes 1013 and 1023 are provided so that the input and output sides thereof are inverted to those of the modulating electrodes 413 and 423, respectively. The optical modulation circuit 1000 according to the second embodiment is a reciprocal passive optical circuit other than the modulating electrodes and thereby has exactly the same functions as those of the optical modulation circuit 400 according to the first embodiment illustrated in FIG. 4. In the optical modulation circuit 400 according to the first embodiment, the driving signal of the Mach-Zehnder modulating portion 420 needs be delayed with respect to the driving signal of the Mach-Zehnder modulating portion 410. Since the optical modulation circuit 1000 according to the second embodiment has the input and output sides inverted, the driving signal of the Mach-Zehnder modulating portion 510 needs be delayed with respect to the driving signal of the Mach-Zehnder modulating portion 520.

As for the name of each member, the asymmetric light combining portion 407 is replaced with an asymmetric light splitting portion 1007, and the bar-side and cross-side output ports 415 and 416 are replaced with input and output ports 1015 and 1016 of the Mach-Zehnder modulating section 1010, respectively. The names of these members are just changed for the input and output sides are inverted, but the members can be composed of components having the same physical structures as those of the optical modulation circuit 400.

Third Embodiment

Figure 11:
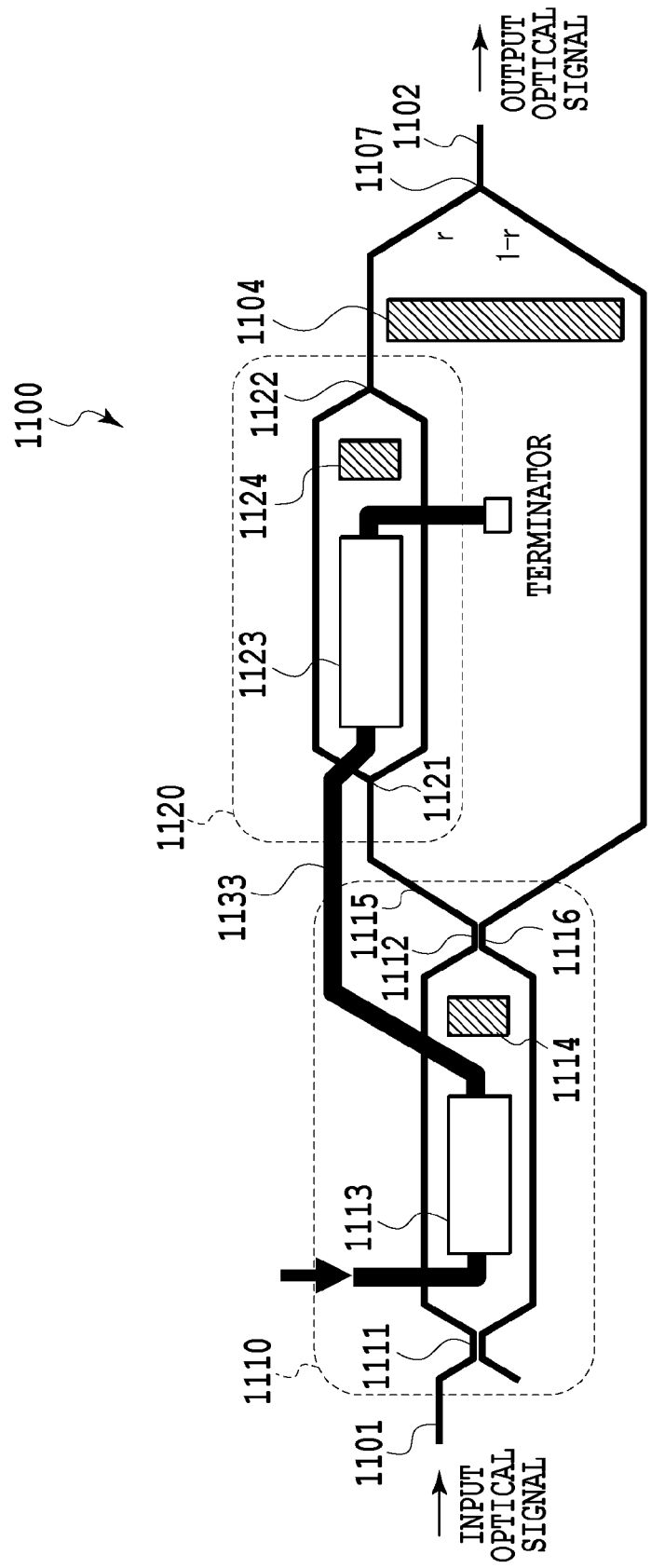
FIG. 11 is a configuration diagram illustrating the configuration of an optical modulation circuit according to a third embodiment of the present invention.

FIG. 11 illustrates an optical modulation circuit 1100 according to a third embodiment of the present invention.

In FIG. 11, the optical modulation circuit 1100 according to the third embodiment of the present invention differs from the optical modulation circuit 400 according to the first embodiment illustrated in FIG. 4 in that a modulating electrode 1113 and a modulating electrode 1123 are connected by a connecting portion 1133 to allow the optical modulation circuit 400 to be driven with a single input of driving signal. The other part is the same as that of the optical modulation circuit 400.

As described in the first embodiment, the correction signal $V_2$ driving a Mach-Zehnder modulating portion 1120 is the same as or is inverted to the main signal $V_1$ driving a Mach-Zehnder modulating portion 1110. By using the configuration of the third embodiment, $V_2$ is equal to $V_1$, and the modulation circuit needs to include only one input port for the driving signal, so that electric wiring to drive the modulator can be simplified. The propagation delay $\tau$ due to the connecting portion 1133 needs to be designed so that $\tau=NL/c$ using the aforementioned N and L. The correction signal $V_2$ attenuates because of the propagation loss of the modulating electrode 1113 and connecting portion 1133 with respect to the main signal $V_1$, and $V_{\pi 2}$ needs to be set smaller than $V_{\pi 1}$ accordingly. To be specific, $V_{\pi 2}/V_{\pi 1}$ is set to (amplitude of $V_2$)/(amplitude of $V_1$) by a correcting method, including a method of setting the modulating electrode 1123 longer than the modulating electrode 1113. This can provide the response as expressed by Equation 2. As apparent from the description of the first and second embodiments, the same effects as those of the third embodiment can be obtained in the configuration in which the input and output of light and the input and output of each modulating electrode are individually inverted in the optical modulation circuit according to the third embodiment.

Fourth Embodiment

Figure 12:
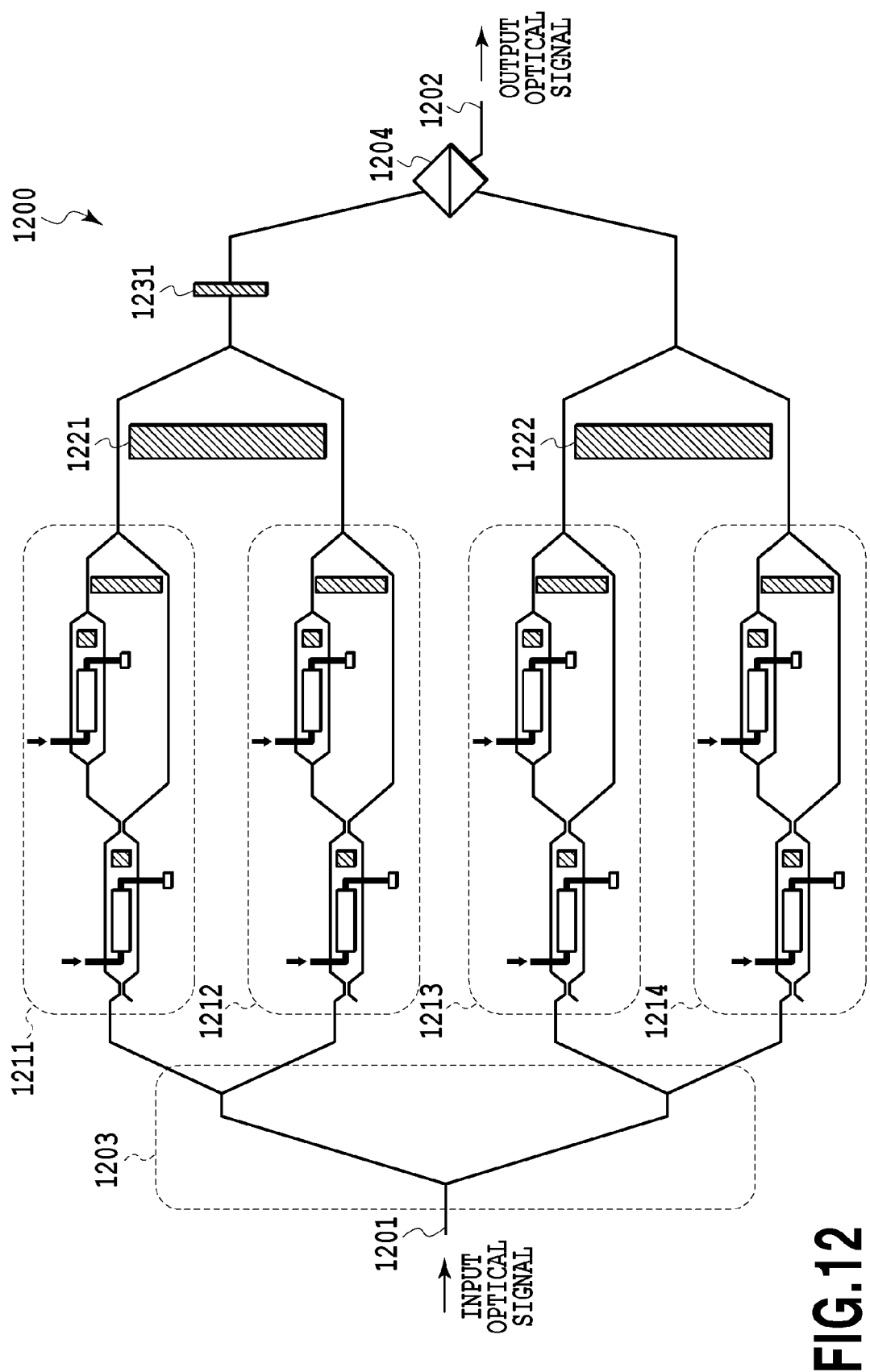
FIG. 12 is a configuration diagram illustrating the configuration of an optical modulation circuit according to a fourth embodiment of the present invention.

FIG. 12 illustrates a polarization multiplexing IQ modulation circuit 1200 according to a fourth embodiment of the present invention.

In FIG. 12, the optical modulation circuit 1200 according to the fourth embodiment of the present invention includes four optical modulation circuits 400 according to the first embodiment illustrated in FIG. 4 in parallel to constitute a polarization multiplexing IQ modulation circuit. Light inputted to a main input port 1201 is split into four by a light splitting portion 1203 to be inputted to high-linearity modulation circuits 1211 to 1214 each having the same configuration as the optical modulation circuit according to the first embodiment illustrated in FIG. 4. After the phases of the optical signals outputted from the high-linearity modulation circuits 1211 and 1212 are adjusted by a DC bias electrode 1221 so that the relative phase thereof is $\pi/2$, the optical signals are then combined. The polarization axis thereof is then rotated by 90 degrees with a polarization rotator 1231. After the phases of the optical signals outputted from the high-linearity modulation circuits 1213 and 1214 are adjusted by a DC bias electrode 1222 so that the relative phase thereof is $\pi/2$, the optical signals are then combined. The both outputted signals are orthogonal-polarization multiplexed by a polarization combining portion 1204 to be outputted from the main output port 1202 as a polarization multiplexed signal.

In the configuration of the fourth embodiment, each of four conventional MZMs which are arranged in parallel in a polarization multiplexing IQ modulator shown in many documents, including NPL1, is replaced with the high-linearity modulation circuit illustrated in FIG. 4. The high-linearity modulation circuits 1211 to 1214 correspond to I and Q components of each polarization channel. Accordingly, the provided polarization multiplexing IQ modulator has a light electric-field response with the non-linearity reduced. Each of the high-linearity modulation circuits 1211 to 1214 may be composed of the optical modulation circuit according to the second embodiment illustrated in FIG. 10 or the optical modulation circuit according to the third embodiment illustrated in FIG. 11 instead of the optical modulation circuits according to the first embodiment illustrated in FIG. 4.

Moreover, a single polarization IQ modulation circuit can be provided in the following manner. In the optical modulation circuit according to the fourth embodiment illustrated in FIG. 12, the light splitting portion 1203 is configured to split light into two, and two adjacent ones of the high-linearity modulation circuits (high-linearity modulation circuits 1211 and 1212, for example) are used. The other two circuits (the high-linearity modulation circuits 1213 and 1214, for example), the polarization rotator 1231, and the polarization combining portion 1204 are eliminated.

As described above, according to the present invention, by generating the secondary component of the response of the light electric-field with respect to driving voltage and adding the same to the primary component, it is possible to provide an optical modulation circuit having response characteristics with the non-linearity reduced.

REFERENCE SIGNS LIST

401, 1001, 1101, 1201: MAIN INPUT PORT
402, 1002, 1102, 1202: MAIN OUTPUT PORT
404, 1004, 1104, 1221, 1222: DC BIAS ELECTRODE
407, 1117: ASYMMETRIC LIGHT COMBINING PORTION
410, 1010, 1110: FIRST MACH-ZEHNDER MODULATING PORTION
411, 1011, 1111: INPUT COUPLER OF FIRST MACH-ZEHNDER MODULATING PORTION
412, 1012, 1112: OUTPUT COUPLER OF FIRST MACH-ZEHNDER MODULATING PORTION
413, 1013, 1113: MODULATING ELECTRODE OF FIRST MACH-ZEHNDER MODULATING PORTION
414, 1014, 1114: DC BIAS ELECTRODE OF FIRST MACH-ZEHNDER MODULATING PORTION
415, 1115: BAR-SIDE OUTPUT PORT OF FIRST MACH-ZEHNDER MODULATING PORTION
416, 1116: CROSS-SIDE OUTPUT PORT OF FIRST MACH-ZEHNDER MODULATING PORTION
420, 1020, 1120: SECOND MACH-ZEHNDER MODULATING PORTION
421, 1021, 1121: INPUT COUPLER OF SECOND MACH-ZEHNDER MODULATING PORTION
422, 1022, 1122: OUTPUT COUPLER OF SECOND MACH-ZEHNDER MODULATING PORTION
423, 1023, 1123: MODULATING ELECTRODE OF SECOND MACH-ZEHNDER MODULATING PORTION
424, 1024, 1124: DC BIAS ELECTRODE OF SECOND MACH-ZEHNDER MODULATING PORTION
1015: BAR-SIDE INPUT PORT OF FIRST MACH-ZEHNDER MODULATING PORTION
1016: CROSS-SIDE INPUT PORT OF FIRST MACH-ZEHNDER MODULATING PORTION
1107: ASYMMETRIC LIGHT SPLITTING PORTION
1133: CONNECTING PORTION OF MODULATING ELECTRODE
1203: LIGHT SPLITTING PORTION
1204: POLARIZATION COMBINING PORTION
1211, 1212, 1213, 1214: HIGH-LINEARITY MODULATION CIRCUIT
1231: POLARIZATION ROTATOR

The invention claimed is:

1. An optical modulation circuit, comprising:
a first Mach-Zehnder modulating portion including a first output port and a second output port, wherein the first Mach-Zehnder modulating portion is push-pull driven by a main signal;
a second Mach-Zehnder modulating portion connected to the first output port of the first Mach-Zehnder modulating portion, wherein the second Mach-Zehnder modulating portion is push-pull driven by a correction signal; and
an asymmetric light combining portion combining an optical signal outputted from an output port of the second Mach-Zehnder modulating portion with an optical signal outputted from the second output port of the first Mach-Zehnder modulating portion in a light intensity coupling ratio of r to 1−r in the same polarization state,
wherein an optical path length from the first output port to the asymmetric light combining portion is substantially equal to an optical path length from the second output port to the asymmetric light combining portion.

2. The optical modulation circuit according to claim 1, wherein the light intensity coupling ratio r is 0<r<0.3.

3. The optical modulation circuit according to claim 1, wherein the correction signal is the same as the main signal or is an inverted signal of the main signal, and wherein a delay equivalent to a propagation time of an optical signal to propagate between the first Mach-Zehnder modulating portion and the second Mach-Zehnder modulating portion is given between the correction signal and the main signal.

4. The optical modulation circuit according to claim 1, further comprising a connecting portion connecting a modulating electrode of the first Mach-Zehnder modulating portion and a modulating electrode of the second Mach-Zehnder modulating portion, wherein a signal propagation delay due to the connecting portion is equal to a propagation time of an optical signal to propagate between the first Mach-Zehnder modulating portion and the second Mach-Zehnder modulating portion.

5. The optical modulation circuit according to claim 4, wherein one of the modulating electrode of the first Mach-Zehnder modulating portion and the modulating electrode of the second Mach-Zehnder modulating portion which is farther from an electrical input is longer than the modulating electrode closer to the electrical input.

6. An optical IQ modulation circuit, comprising:
two optical modulation circuits according to claim 1 arranged in parallel;
a light splitting portion splitting input light from an input port to input the split beams into the two optical modulation circuits;
a light combining portion combining output light beams from the two optical modulation circuits; and
a phase adjustment portion provided on an optical path from the light splitting portion to the light combining portion, wherein the phase adjustment portion adjusts optical phases so that the output light beams from the two optical modulation circuits are combined with an optical phase difference of π/2 by the light combining portion.

7. A polarization multiplexing IQ modulation circuit, comprising:

two optical IQ modulation circuits according to claim 6 arranged in parallel;
a light splitting portion which splits input light from an input port to input the split beams into the two optical IQ modulation circuits;
a polarization rotator rotating polarization of an output light beam from a first optical IQ modulation circuit among the two optical IQ modulation circuits by 90 degrees; and
a polarization combining portion orthogonal polarization-multiplexing the output light beam from the first optical IQ modulation circuit with the polarization rotated by the polarization rotator and an output light beam from the second optical IQ modulation circuit to output to the output port as a polarization multiplexed signal.

8. An optical modulation circuit, comprising:
a first Mach-Zehnder modulating portion including a first input port and a second input port, wherein first Mach-Zehnder modulating portion is push-pull driven by a main signal;
a second Mach-Zehnder modulating portion connected to the first input port of the first Mach-Zehnder modulating portion, wherein the second Mach-Zehnder modulating portion is push-pull driven by a correction signal; and
an asymmetric light combining portion splitting an input optical signal in a light intensity splitting ratio of r to 1−r to an input port of the second Mach-Zehnder modulating portion and the second input port of the first Mach-Zehnder modulating portion,
wherein an optical path length from the asymmetric light splitting portion to the first input port is substantially equal to an optical path length from the asymmetric light splitting portion to the second input port.

9. The optical modulation circuit according to claim 8, wherein the light intensity coupling ratio r is 0<r<0.3.

10. The optical modulation circuit according to claim 8, wherein the correction signal is the same as the main signal or is an inverted signal of the main signal, and wherein a delay equivalent to a propagation time of an optical signal to propagate between the first Mach-Zehnder modulating portion and the second Mach-Zehnder modulating portion is given between the correction signal and the main signal.

11. The optical modulation circuit according to claim 8, further comprising a connecting portion connecting a modulating electrode of the first Mach-Zehnder modulating portion and a modulating electrode of the second Mach-Zehnder modulating portion, wherein a signal propagation delay due to the connecting portion is equal to a propagation time of an optical signal to propagate between the first Mach-Zehnder modulating portion and the second Mach-Zehnder modulating portion.

12. The optical modulation circuit according to claim 11, wherein one of the modulating electrode of the first Mach-Zehnder modulating portion and the modulating electrode of the second Mach-Zehnder modulating portion which is farther from an electrical input is longer than the modulating electrode closer to the electrical input.

13. An optical IQ modulation circuit, comprising:
two optical modulation circuits according to claim 8 arranged in parallel;
a light splitting portion splitting input light from an input port to input the split beams into the two optical modulation circuits;
a light combining portion combining output light beams from the two optical modulation circuits; and
a phase adjustment portion provided on an optical path from the light splitting portion to the light combining portion, wherein the phase adjustment portion adjusts optical phases so that the output light beams from the two optical modulation circuits are combined with an optical phase difference of $\pi/2$ by the light combining portion.

14. A polarization multiplexing IQ modulation circuit, comprising:
two optical IQ modulation circuits according to claim 13 arranged in parallel;
a light splitting portion which splits input light from an input port to input the split beams into the two optical IQ modulation circuits;
a polarization rotator rotating polarization of an output light beam from a first optical IQ modulation circuit among the two optical IQ modulation circuits by 90 degrees; and
a polarization combining portion orthogonal polarization-multiplexing the output light beam from the first optical IQ modulation circuit with the polarization rotated by the polarization rotator and an output light beam from the second optical IQ modulation circuit to output to the output port as a polarization multiplexed signal.

* * * * *